Oct. 16, 1956  D. O. HATFIELD  2,767,339

DYNAMO-ELECTRIC ROTOR

Filed July 14, 1950

*INVENTOR:*
DORAN O. HATFIELD
BY
ATT'YS

United States Patent Office 2,767,339
Patented Oct. 16, 1956

2,767,339

DYNAMOELECTRIC ROTOR

Doran O. Hatfield, Chicago, Ill., assignor to Bodine Electric Company, Chicago, Ill., a corporation of Illinois Application July 14, 1950, Serial No. 173,918

4 Claims. (Cl. 310—162)

This invention relates to rotors for dynamoelectric machines, and particularly to machines of the hysteresis or permanent magnet type, in which one or more members of magnetizable material is secured to a shaft by means of non-magnetic supports.

In dynamoelectric machines of this type the core or body of the rotor has to be made of highly magnetic material, and the mounting for the core on the shaft has to be made of non-magnetic material in order to prevent internal flux leakage which would seriously reduce rotor efficiency. Heat is generated during the operation of the machine, and because of the difference in the coefficient of expansion of two such metals a problem has always been presented in maintaining a satisfactory support of the core on the shaft throughout the range of temperatures occurring within the machine. If a satisfactory fit of the mounting members with the core and shaft is obtained for lower temperatures, the greater expansion of the mounting member, upon heating of the assembly, endangers the core to fractures due to its hard brittle character; and core fracture means an inoperable machine. On the other hand, if the fit of the mounting member is proper for the higher operating temperatures, the fit is likely to be too loose at the lower temperatures, with a consequent deficiency in the operability of the machine.

The main objects of this invention, therefore, are to provide an improved form of non-magnetic support or mounting member for the magnetic core of a hysteresis or permanent magnet type of dynamo machine; to provide an improved mounting of this kind which is so constructed as to yieldingly adjust itself physically to the full range of operating temperatures and maintain secure constant supporting contact with the core and with the shaft; and to provide an improved dynamo-core mounting member of this kind which is simple in construction, hence inexpensive to manufacture, and which is economical in use in the production assembly of the complete rotor.

A specific embodiment of the invention is shown in the accompanying drawings in which.

Figure 1:
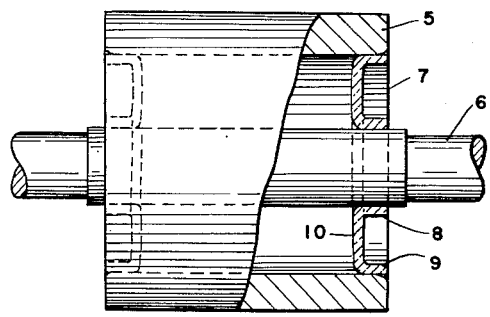
Fig. 1 is a side elevation of a hysteresis rotor constructed in accordance with this invention, part of the core being broken away to more clearly indicate the form of the core mounting.
Figure 2:
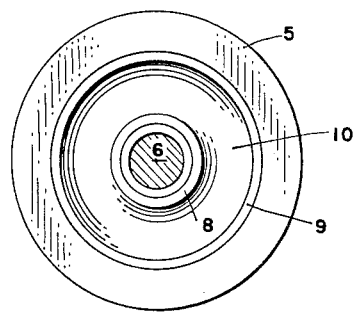
Fig. 2 is an end elevation of the same.

The essential concept of this invention involves so forming the non-magnetic core mounting means that the section intermediate those parts which provide driving fit with the shaft and with the core respectively will yield sufficiently physically during an increase in operating temperatures to avoid any likelihood of creating pressures on the core capable of causing its fracture and yet maintain secure operative relationship between the shaft and core at the lower temperatures.

The particular embodiment of this invention in the herein shown rotor comprises a core 5, a shaft 6, and a pair of mounting members 7.

The core 5 is of the usual construction for hysteresis rotors and is made of a suitable magnetizable material such as iron or steel. The core is shown herein as solid. However, it will be understood that the core may be laminated or sectional provided that the laminations or sections are suitable supported, as on a thin wall cylinder, to form an integral unit.

The shaft 6 is likewise of conventional material used for this purpose preferably steel, which is of a fairly high high magnetizable character.

The mountings 7 are formed of any suitable non-magnetic material, preferably brass which is practically non-magnetizable, and as herein shown, are in the form of a pair of channel rings disposed back to back, one in each end of the core 5, and each with axially disposed parallel flange parts 8 and 9 and a transverse radial part 10. The diameter of the bore and of the periphery of these respective flange parts 8 and 9 are such that at normal room temperature they will permit a press fit on the shaft 6 and within the core 5. When so fitted, the radial transverse part 10 becomes slightly bowed or arched axially outward from a plane normal to the flange parts 8 and 9 and the diameters of the flange parts are so designed that this arched condition will exist at the lowest temperature to which the rotor may be subjected.

Figure 4:
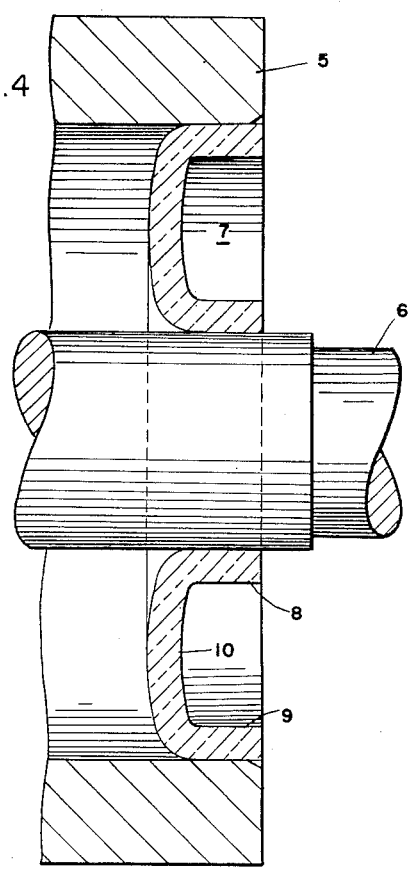
Fig. 4 is a similar view but showing, somewhat exaggeratedly, the self-adjusting character of the radial part of the mounting when subjected to high temperatures occurring during operation of the rotor.

In the operation of hysteresis dynamos, materially high temperatures are created which necessarily cause an expansion of the several parts of the rotor. The expansion coefficient of iron being essentially less than that of brass results in the greater expansion taking place in the mountings 7 and consequently directing pressure against the inside of the core 5. Thus as these temperatures rise during operation of the rotor the expansion force on the mounting members 7 tends to increase the radial distance between the axially disposed parallel parts 8 and 9 of the mounting members 7. Obviously this force is resisted by the core 5. However, because of the arched form of the radial parts 10 of the mountings 7, they tend to yield physically to this expansive force and become more bowed, as indicated in Fig. 4. This bowing of the transverse parts 10 increases as the operating temperature rises and thereby absorbs the pressure that would otherwise be directed against the core 5.

Figure 3:
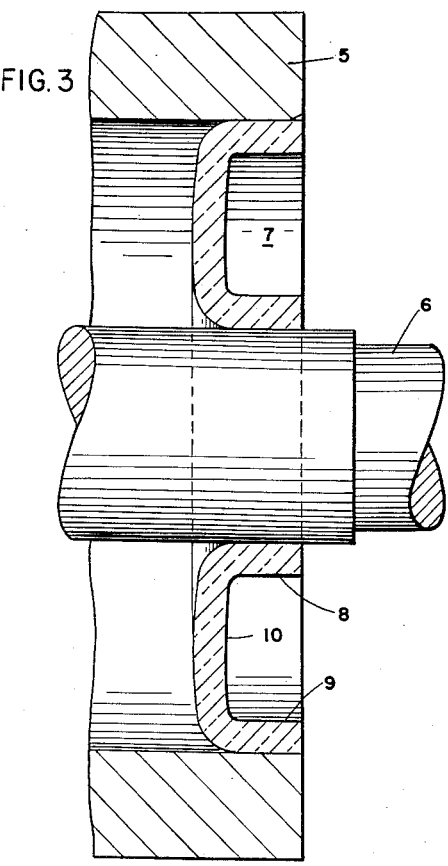
Fig. 3 is an enlarged, fragmentary, sectional view of the rotor shown in Fig. 1 with the yieldable radial part of the mounting shown in its normal condition at room temperature.

With the receding of the temperatures in the rotor parts the bowed portions 10 will assume their normal arched form, as shown in Fig. 3, thereby maintaining the press fit of the axially disposed parts 8 and 9 with the shaft 6 and the core 5 respectively.

The channel ring mountings 7 may be drawn from brass sheet stock, or other suitable non-magnetic material, and are made as nearly alike as possible in order that the curvature imparted to the radial portion 10, and the bowed condition normally present when the channel rings have been press fitted onto the shaft and into the core, will be substantially the same. In this manner the curvature changes arising from temperature changes will be substantially the same at each end of the core and the pressure on the core will be uniform. Also the pressure exerted between the shaft and the core will be constant and a firm supporting fit of the mounting means will be assured at all times regardless of the temperature conditions that may exist.

The main advantages of this invention reside in the provision for automatic physical self-adjustment of the core mounting means in direct relation to changes of temperature occurring in the rotor parts during their operation, whereby the rotor core is at all times firmly secured to and supported from the shaft. Other advantages are to be found in the simplicity of the form and construction of the mounting means and in the simplicity of their assembly into the rotor whereby low manufacturing and assembly costs are obtained.

Although but one specific embodiment of this invention is herein shown and described, it will be understood that details of the construction shown may be altered or omitted without departing from the spirit of this invention as defined by the following claims.

I claim:

1. In combination with the hollow magnetic core of a dynamo motor and a central supporting shaft therefor, a mounting means for said rotor comprising a member in the form of an individual axially opening channel shaped ring having a pressed fit between the core and said shaft, the radial part of said ring having a resilient radially extending arch therein capable of yielding in response to radial strains produced by the changing operating temperatures in the rotor whereby the axially disposed parallel parts of said ring are maintained in constant operable contact with the inner surface of the core and the supporting shaft.

2. A rotor for a dynamo comprising a shaft, a hollow magnetizable rotor core, and an individual mounting member for securing said core in concentric rotative relationship with said shaft, said mounting member being formed with axially disposed parallel parts and a radially disposed transverse part, said axially disposed parallel parts having press fit relation with the interior of said core and exterior of said shaft respectively, and said transverse part having a radially arched portion physically yieldable in response to radial expansion and contraction produced by the changing operating temperatures in the rotor whereby the fit of said axially disposed parts with said core and shaft is maintained throughout said temperature range.

3. In combination with the hollow magnetic core of a rotor of the hysteresis type and a central supporting shaft, a mounting means comprising a ring-like member of resilient non-magnetic material disposed radially between the core and said central shaft and having a peripheral press-fit relation with both the core and the shaft, said ring-like member having a preformed arch in its radial portion intermediate the said core and shaft.

4. A rotor and shaft assembly comprising a hollow cylindrical core of magnetic material, a shaft extending axially through the center of said core, and a pair of annular non-magnetic supporting members extending radially between said shaft and said core, each of said supporting members comprising a ring pressed-fitted onto the shaft and into a respective end of said core, and each of said rings having a resilient radial portion bowed in the axial direction intermediate the shaft and core.

References Cited in the file of this patent
UNITED STATES PATENTS

| | | |
|---|---|---|
| 1,275,292 | Neuland | Aug. 13, 1918 |
| 1,541,410 | Cowley | June 9, 1925 |
| 1,752,675 | Larson | Apr. 1, 1930 |
| 1,884,115 | Morrill | Oct. 25, 1932 |
| 1,884,140 | Nickle | Oct. 25, 1932 |
| 1,990,805 | Watson et al. | Feb. 12, 1935 |
| 1,990,806 | Watson et al. | Feb. 12, 1935 |
| 2,468,295 | Hush | Apr. 26, 1949 |